US012599853B1

(12) United States Patent
Liu

(10) Patent No.: US 12,599,853 B1
(45) Date of Patent: Apr. 14, 2026

(54) SWIMMING POOL FILTER CARTRIDGE

(71) Applicant: Hangzhou Buda Water Treatment Equipment Co., Ltd, Hangzhou (CN)

(72) Inventor: Budan Liu, Hangzhou (CN)

(73) Assignee: Hangzhou Buda Water Treatment Equipment Co., Ltd, Hangzhou (CN)

( * ) Notice: Subject to any disclaimer, the term of this patent is extended or adjusted under 35 U.S.C. 154(b) by 0 days.

(21) Appl. No.: 19/223,320

(22) Filed: May 30, 2025

(51) Int. Cl.
B01D 29/13 (2006.01)
(52) U.S. Cl.
CPC ........ B01D 29/13 (2013.01); B01D 2201/127 (2013.01); B01D 2201/291 (2013.01)
(58) Field of Classification Search
CPC .............. B01D 29/13; B01D 2201/127; B01D 2201/291
USPC ......... 210/493.2, 493.1, 495, 485, 487, 282, 210/167.1, 416.2, 450, 455, 471
See application file for complete search history.

(56) References Cited

U.S. PATENT DOCUMENTS

| | | | |
|---|---|---|---|
| 2,988,227 A * | 6/1961 | Harms | B01D 29/668 |
| | | | 210/493.2 |
| 5,190,651 A | 3/1993 | Spencer et al. | |
| 5,601,717 A | 2/1997 | Villette et al. | |
| 2004/0047675 A1 | 3/2004 | Bonelli et al. | |
| 2022/0387914 A1 * | 12/2022 | Calcaterra | C09J 5/06 |

* cited by examiner

*Primary Examiner* — Madeline Gonzalez

(57) ABSTRACT

A swimming pool filter cartridge includes a filter element, a body, and a fixing element. The filter element includes radially extending pleats. The pleats include a plurality of inner pleats defining a central chamber and a plurality of outer pleats defining an outer contour. The body extends through the central chamber and is connected to the plurality of inner pleats. The fixing element extends circumferentially along the outer contour. The fixing element includes a head end and a tail end, the head end is provided with a connection head, the tail end is provided with a connection seat, the connection head is detachably connected to the connection seat to allow the head end and the tail end of the fixing element to be connected and sleeved on the plurality of outer pleats, and the plurality of outer pleats are connected to an inner end surface of the fixing element.

14 Claims, 15 Drawing Sheets

A - A

E

SWIMMING POOL FILTER CARTRIDGE

TECHNICAL FIELD

The present disclosure relates to the technical field of filter cartridges, and in particular to a swimming pool filter cartridge.

BACKGROUND

During the use of swimming pool filter cartridges, impurities often accumulate on the filter element, which compromises filtration efficiency and drainage speed. Regular cleaning is therefore required to extend the filter's service life.

SUMMARY

A first aspect of the present disclosure provides a swimming pool filter cartridge, including: a filter element including radially extending pleats, the pleats including a plurality of inner pleats defining a central chamber and a plurality of outer pleats defining an outer contour; a body extending through the central chamber and connected to the plurality of inner pleats; and a fixing element extending circumferentially along the outer contour, the fixing element including a head end and a tail end, the head end being provided with a connection head, the tail end being provided with a connection seat, the connection head being detachably connected to the connection seat to allow the head end and the tail end of the fixing element to be connected and sleeved on the plurality of outer pleats, and the plurality of outer pleats being connected to an inner end surface of the fixing element.

A second aspect of the present disclosure provides a swimming pool filter cartridge, including: a filter element including a plurality of inner pleats defining a central chamber and a plurality of outer pleats defining an outer contour; a body extending through the central chamber and connected to the plurality of inner pleats; and a fixing element extending circumferentially along the outer contour, the fixing element including a head end and a tail end, the head end being provided with a connection head, the tail end being provided with at least two connection seats, the connection head being detachably connected to one of the at least two connection seats to allow the head end and the tail end of the fixing element to be connected and sleeved outside the plurality of outer pleats.

A third aspect of the present disclosure provides a swimming pool filter cartridge, including: a filter element including radially extending pleats defining a central chamber; a body disposed in the central chamber; a fixing element extending circumferentially along an outside of the pleats, the fixing element including a head end and a tail end, the head end being provided with a connection head, the tail end being provided with a connection seat, the connection head being detachably connected the connection seat; and a first end cap and a second end cap, the first end cap and the second end cap being respectively connected to a first end and a second end of the body, and two ends of the filter element being respectively connected to the first end cap and the second end cap.

BRIEF DESCRIPTION OF THE DRAWINGS

The drawings that form part of the present disclosure are provided to further illustrate the present disclosure. The illustrative embodiments and their descriptions of the present disclosure are intended to explain but do not constitute an undue limitation on the present disclosure.

DETAILED WAY

Figure 1:
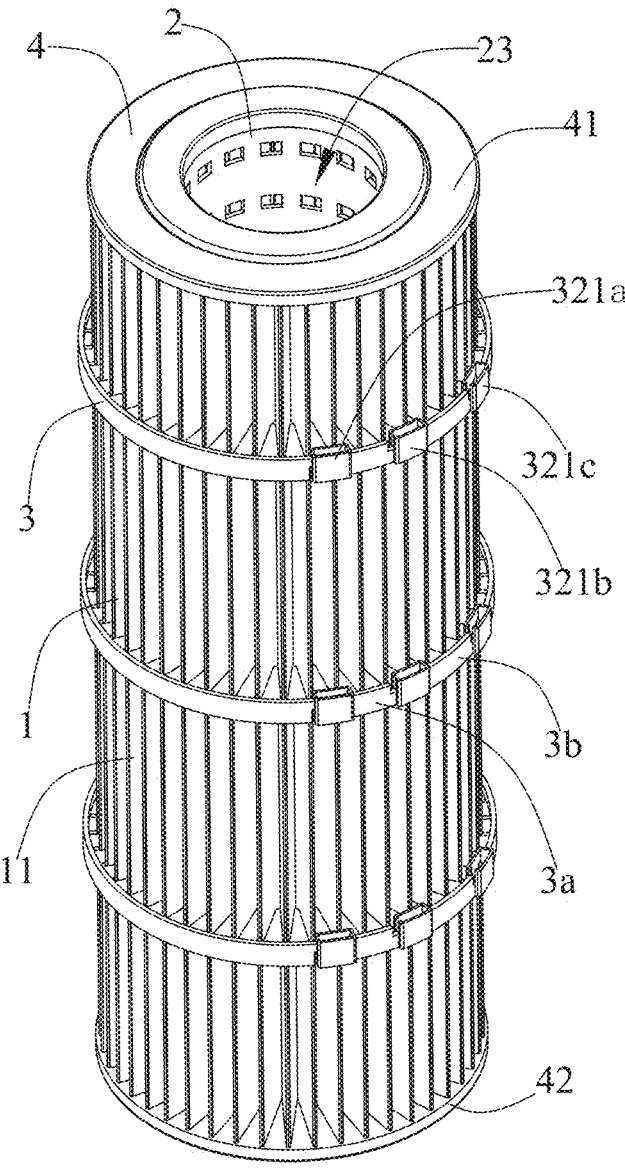
FIG. 1 is a perspective view of a swimming pool filter cartridge according to some embodiments of the present disclosure.
Figure 2:
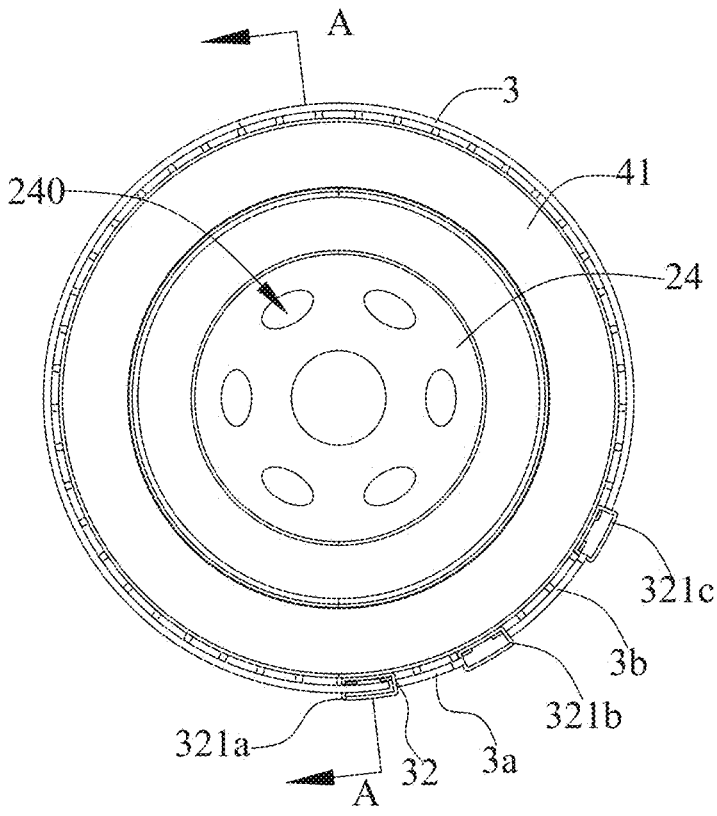
FIG. 2 is a top view of FIG. 1.
Figure 3:
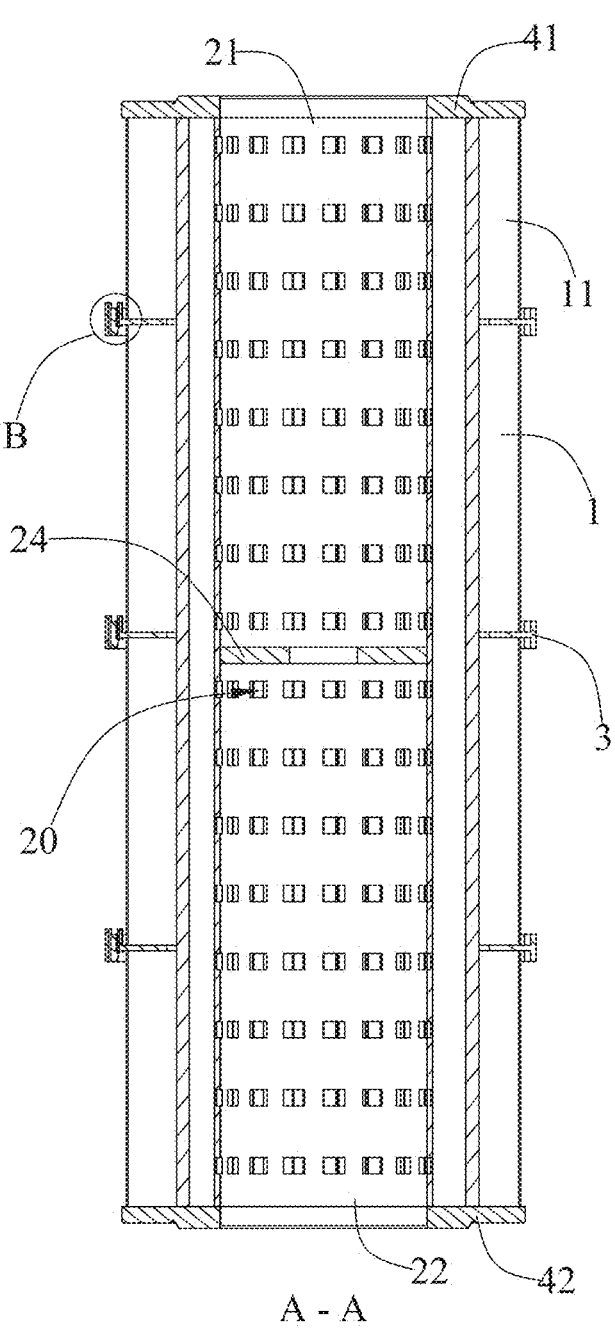
FIG. 3 is a cross-sectional view taken along line A-A in FIG. 2.
Figure 4:
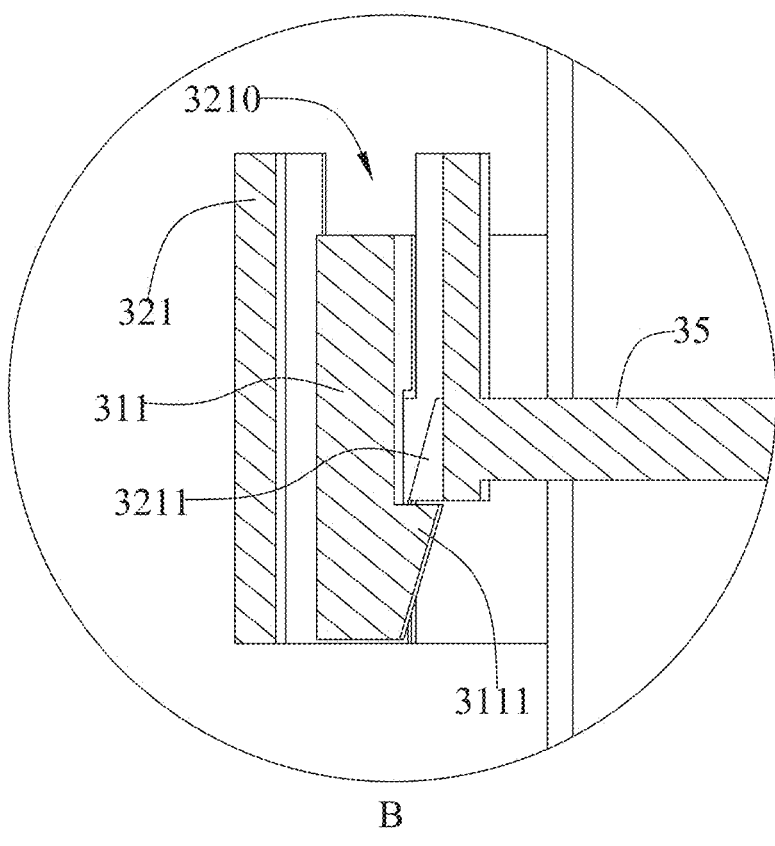
FIG. 4 is an enlarged view of area B in FIG. 3.
Figure 5:
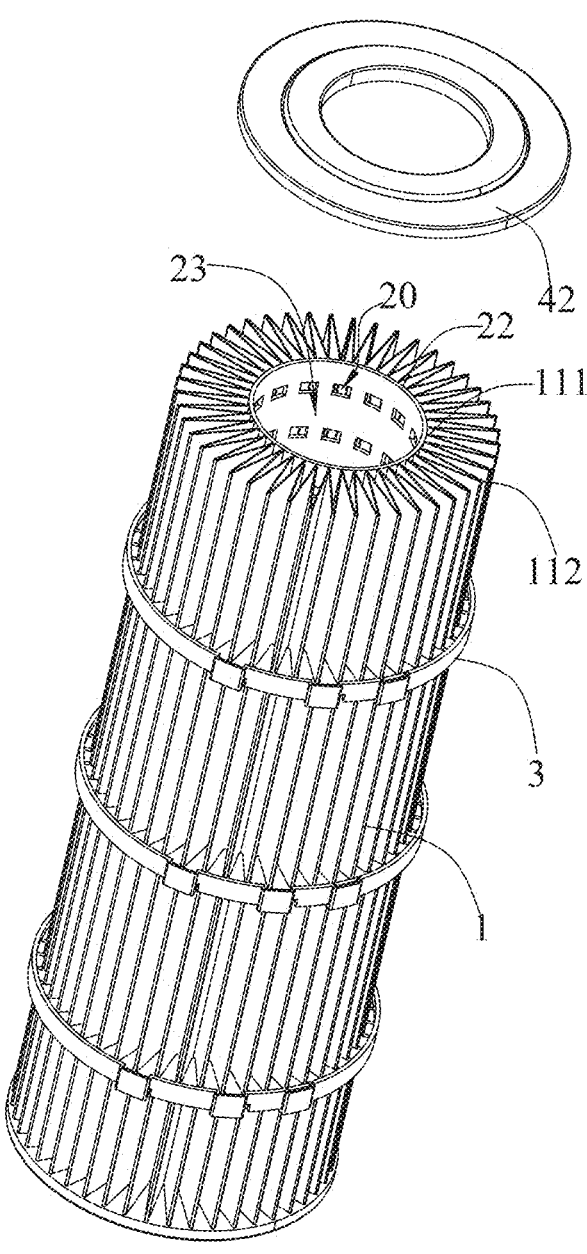
FIG. 5 is an exploded view of a swimming pool filter cartridge according to some embodiments of the present disclosure.
Figure 6:
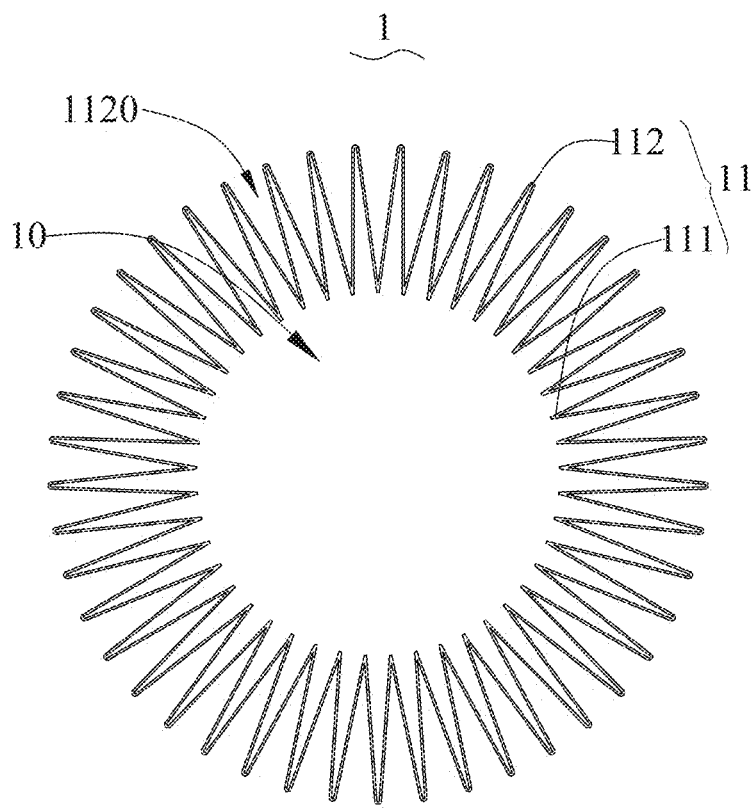
FIG. 6 is a perspective view of a filter element according to some embodiments of the present disclosure.
Figure 7:
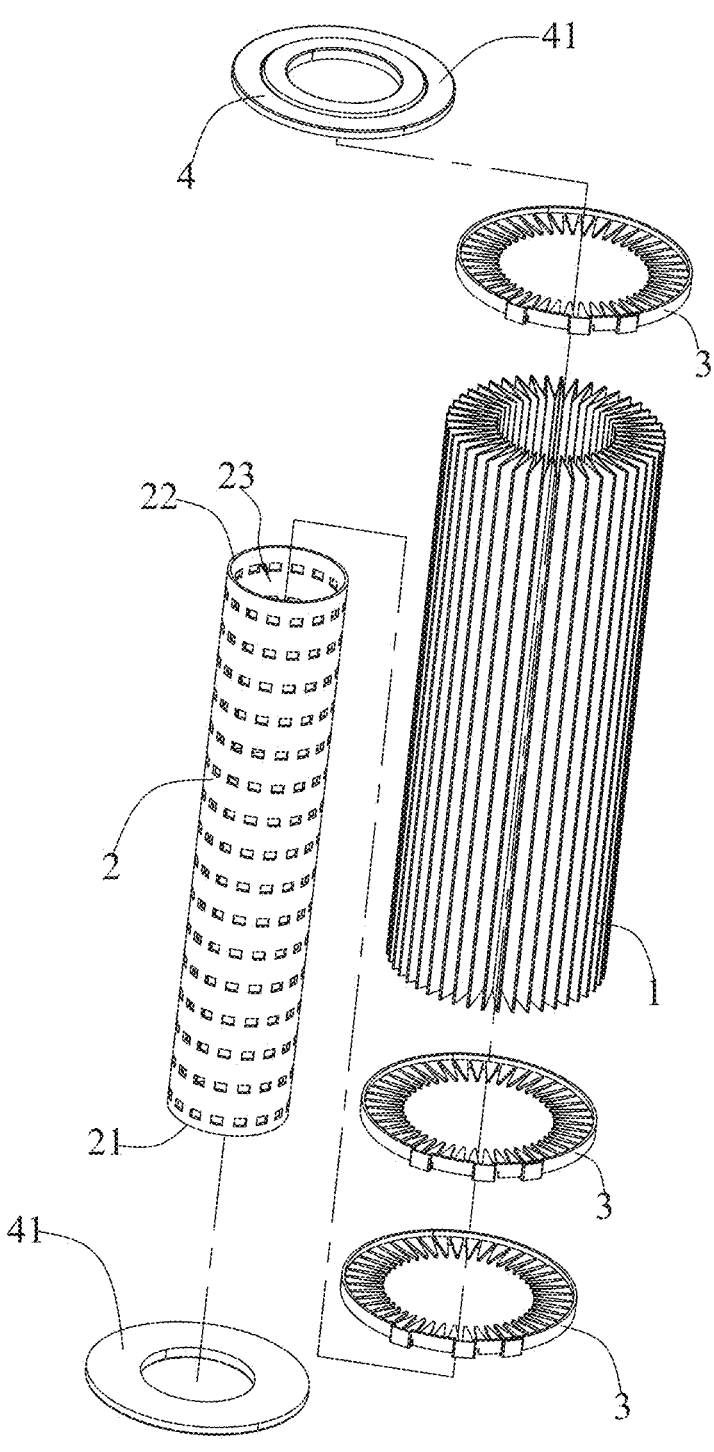
FIG. 7 is an exploded view of a swimming pool filter cartridge according to some embodiments of the present disclosure.
Figure 8:
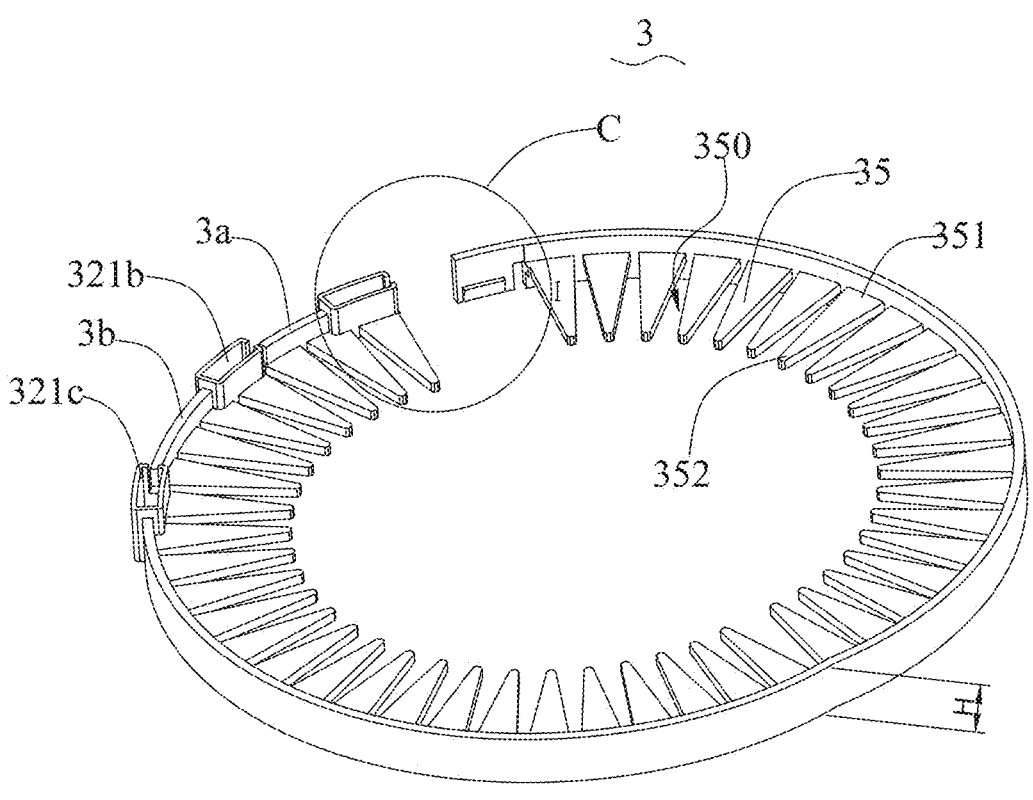
FIG. 8 is a perspective view of a fixing member according to some embodiments of the present disclosure, showing a connection head and a connection seat are not assembled.
Figure 9:
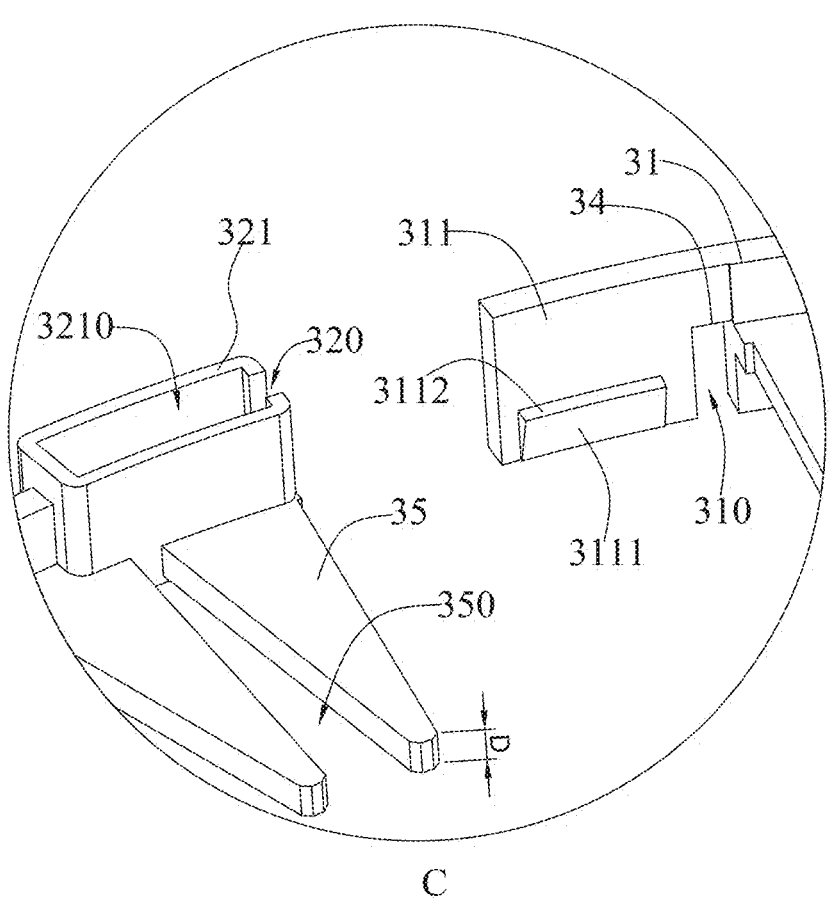
FIG. 9 is an enlarged view of area C in FIG. 8.
Figure 10:
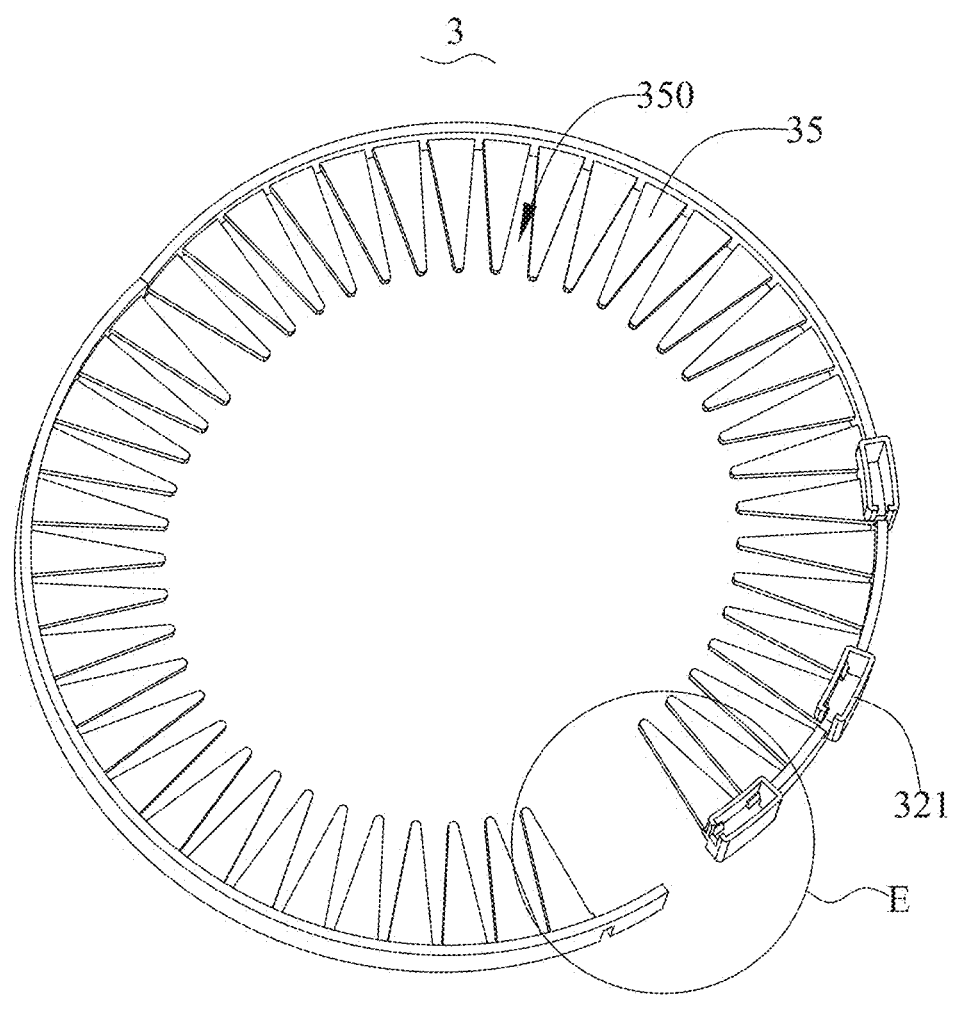
FIG. 10 is a perspective view of a fixing member according to some embodiments of the present disclosure, showing a connection head and a connection seat are not assembled.
Figure 11:
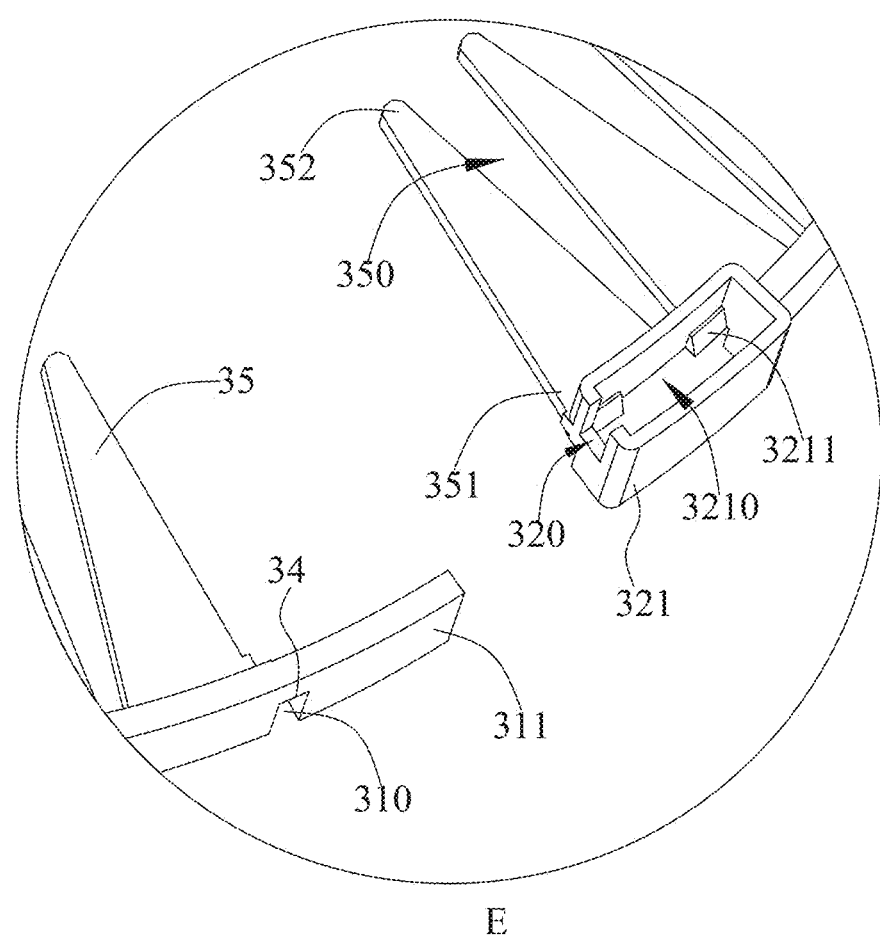
FIG. 11 is an enlarged view of area E in FIG. 10.
Figure 12:
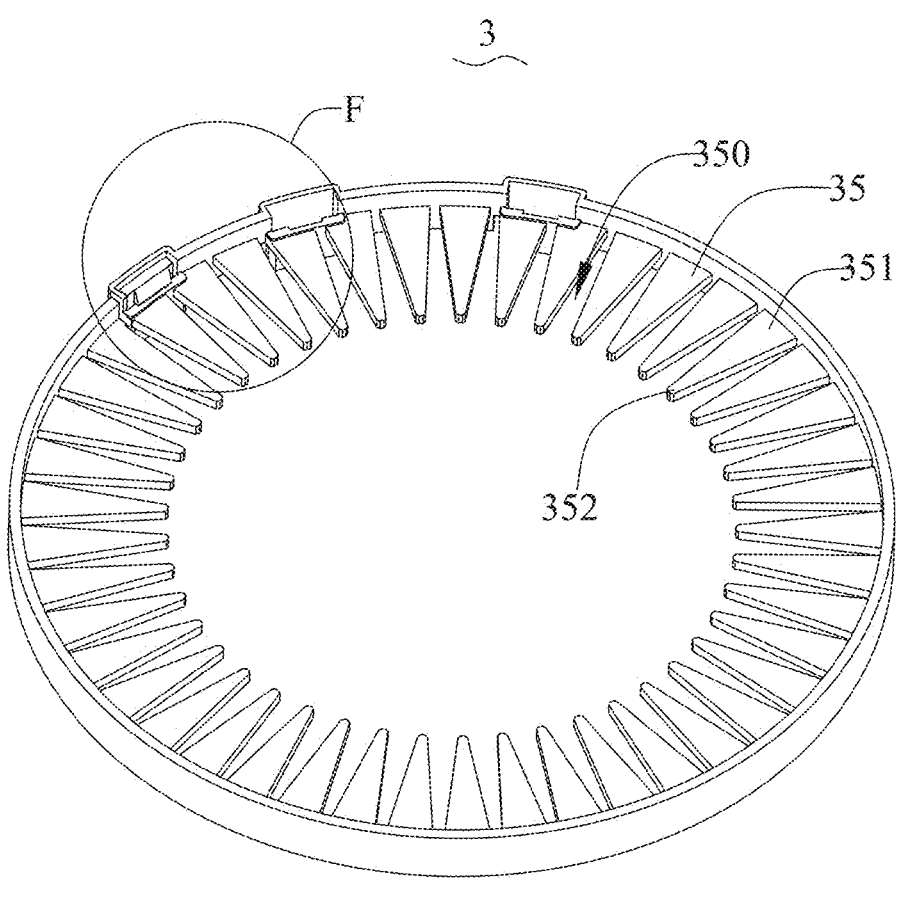
FIG. 12 is a perspective view of a fixing member according to some embodiments of the present disclosure, showing a connection head and a connection seat are assembled.
Figure 13:
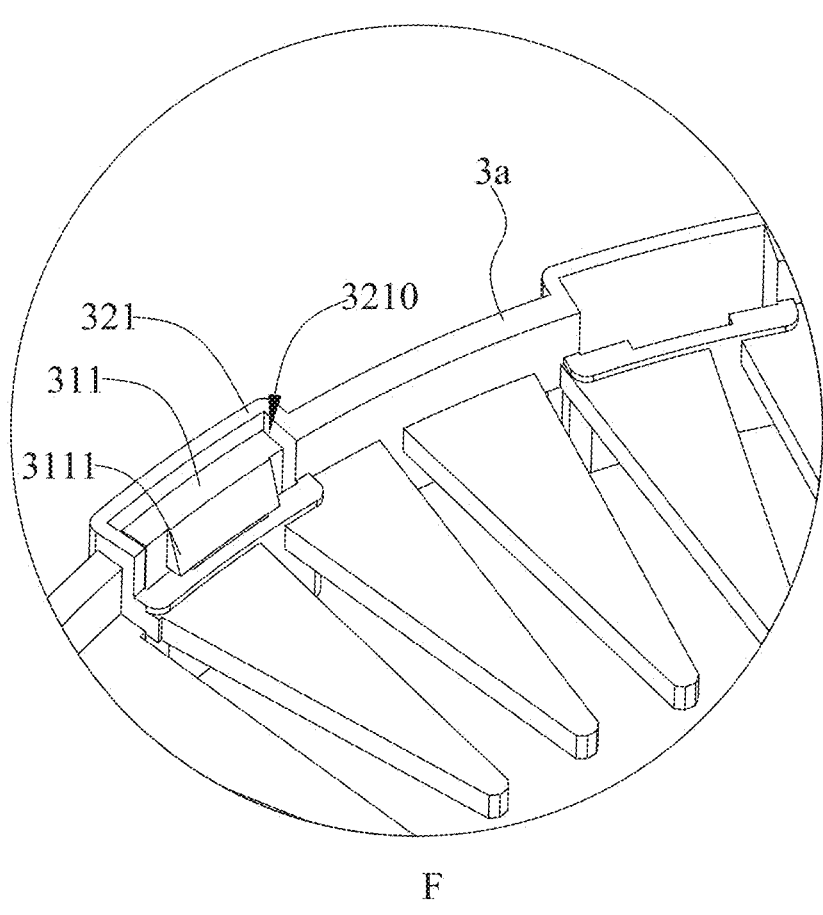
FIG. 13 is an enlarged view of area F in FIG. 12.

The following will be combined with the drawings in the embodiments of the present disclosure to clearly and completely describe the technical solutions in the embodiments of the present disclosure. Obviously, the described embodiments are only part but not all of the embodiments. Based on the embodiments in the present disclosure, all other embodiments obtained by those skilled in the art without creative work belong to the protection scope of the present disclosure.

It should be noted that all directional indications in the embodiments of the present disclosure (such as up, down, left, right, front, back, etc.) are only configured to explain the relative position relationship, movement, etc. between the components under a certain posture (as shown in the drawings). If the specific posture changes, the directional indication will also change accordingly.

In the present disclosure, unless otherwise clearly specified and limited, the terms "connection", "fixation", etc. should be understood in a broad sense. For example, "fixation" may be a fixed connection, a detachable connection, or an integral connection; it may be a mechanical connection or an electrical connection; it may be directly connected or indirectly connected through an intermediate medium, it may be the internal connection of two elements or the interaction relationship between two elements, unless otherwise clearly defined. For those skilled in the art, the specific meanings of the above terms in the present disclosure may be understood according to the specific circumstances.

In addition, if there are descriptions involving "first", "second", etc. in the embodiments of the present disclosure, the descriptions of "first", "second", etc. are only for descriptive purposes and cannot be understood as indicating or implying their relative importance or implicitly indicating the number of technical features indicated. Therefore, the features defined as "first" and "second" may explicitly or implicitly include at least one of the features. In addition, the meaning of "and/or" appearing in the full text includes three parallel schemes. Taking "A and/or B" as an example, it includes scheme A, scheme B, or schemes that satisfy both A and B. In addition, the technical schemes between the various embodiments may be combined with each other, but they must be based on the ability of those skilled in the art to implement them. When the combination of technical schemes is contradictory or cannot be implemented, it should be considered that such a combination of technical schemes does not exist and is not within the protection scope required by the present disclosure.

Traditional filter cartridges typically employ pleated filter cloth arranged in pleats to enhance filtration performance. This pleated filter cloth is permanently bonded to the main body of the filter using adhesive, with additional fastening bands installed around the periphery to maintain the pleated configuration. However, existing fastening components in the related art cannot be disassembled once installed. If high-pressure flushing causes deformation of the pleats or disengagement from the restraints, there is no way to remove and readjust these components.

As illustrated in FIG. 1 to FIG. 6, the present disclosure relates to a swimming pool filter cartridge, which is mainly adapted to a swimming pool filter and is configured to filter water entering the swimming pool. The swimming pool filter cartridge mainly includes a filter element 1, a body 2 and a fixing member 3. The fixing member 3 can secure the filter element 1, reducing mechanical wear to the swimming pool filter cartridge during filtering cycles, thus extending the life span of the swimming pool filter cartridge.

In some embodiments, the filter element 1 has radially extending pleats 11. The pleats 11 include a plurality of inner pleats 111 defining a central chamber 10 and a plurality of outer pleats 112 defining an outer contour. The body 2 extends through the central chamber 10 and is connected to the plurality of inner pleats 111, allowing the filter element 1 and the body 2 to be one piece. The fixing member 3 extends circumferentially along the outer contour defined by the plurality of outer pleats 112. The fixing member 3 has a head end 31 and a tail end 32. The head end 31 is provided with a connection head 311, and the tail end 32 is provided with a connection seat 321. The connection head 311 and the connection seat 321 are detachably connected, allowing the head end 31 and the tail end 32 of the fixing member 3 to be fastened to the plurality of outer pleats 112. The plurality of outer pleats 112 are connected to an inner end surface 33 of the fixing member 3.

The fixing member 3 can improve the structural integrity of the plurality of outer pleats 112, thereby reducing the deformation of the plurality of outer pleats 112 or the detachment from the fixing member 3 due to excessive pressure on the filter element 1 during the filtering cycles. The fixing member 3 is detachably arranged by means of the connection head 311 and the connection seat 321. In the event of the deformation or detachment of the plurality of outer pleats 112 from the fixing member 3, the fixing member 3 allows disengagement from the plurality of outer pleats 112, and the plurality of outer pleats 112 are adjusted, and then the fixing member 3 is re-fastened to the plurality of outer pleats 112. The fixing member 3 thus arranged not only improves the structural integrity of the plurality of outer pleats 112, but also reduces direct damage by adjusting the plurality of outer pleats 112 after disassembly. The fixing member 3 can be replaced to secure the plurality of outer pleats. When cleaning the swimming pool filter cartridge, the fixing member 3 is disassembled first, and then the filter element 1 is cleaned. After the cleaning is completed, the plurality of outer pleats 112 is re-tied and secured by the fixing member 3.

As illustrated in FIG. 1 to FIG. 6, in some embodiments, a plurality of connection seats 321 are provided, the plurality of connection seats 321 are arranged at intervals along an extension direction of the fixing member 3, and the connection head 311 can be selectively inserted into one of the plurality of connection seats 321.

In some embodiments, multiple connection seats 321 enable the fixing member 3 to be installed according to the radial profile defined by the plurality of outer pleats 112. By selectively inserting one connection head 311 into a connection seat 321, the circumference of the annular assembly formed upon joining the head end 31 and the tail end 32 of the fixing member 3, is adjustable. Thus, the same fixing member 3 can adapt to the filter element 1 of different radial sizes.

In some embodiments, the fixing member 3 is made of a cuttable material, such as plastic, rubber, etc. There are three connection seats 321, which are a first connection seat 321a, a second connection seat 321b and a third connection seat 321c. A portion of the fixing member 3 located between the first connection seat 321a and the second connection seat 321b is a first portion 3a, and another portion of the fixing member 3 located between the second connection seat 321b and the third connection seat 321c is a second portion 3b.

Before the head end 31 and the tail end 32 of the fixing member 3 are connected, if the connection head 311 needs to be connected to the second connection seat 321b, the first portion 3a and the first connection seat 321a need to be cut out before the connection head 311 can be inserted into the second connection seat 321b. Similarly, if the connection head 311 needs to be connected to the third connection seat 321c, the first connection seat 321a, the second connection seat 321b, the first portion 3a and the second portion 3b need to be cut out before the connection head 311 can be inserted into the third connection seat 321c.

As illustrated in FIG. 7 to FIG. 13, in some embodiments, the connection seat 321 defines an insertion cavity 3210 for inserting the connection head 311, and a first engaging portion 3211 is provided on an inner wall of the insertion cavity 3210. The connection head 311 is provided with a second engaging portion 3111, which is configured to be inserted into the insertion cavity 3210 and engaged with the first engaging portion 3211 to achieve detachable assembly between the connection head 311 and the connection seat 321.

In some embodiments, the first engaging portion 3211 is protruded on an inner sidewall of the insertion cavity 3210, and the second engaging portion 3111 is protruded on one sidewall of the connection head 311 facing the first engaging portion 3211. The second engaging portion 3111 defines a positioning end face 3112. When the connection head 311 is inserted into the connection seat 321, the second engaging portion 3111 passes through the insertion cavity 3210, and the positioning end face 3112 abuts against a lower end face of the first engaging portion 3211, allowing the connection head 311 to be secured in the insertion cavity 3210. The connection head 311 passes through the insertion cavity 3210 and abuts against the first engaging portion 3211, which effectively improves the structural integrity and firmness of the assembly between the connection head 311 and the connection seat 321.

In some embodiments, the first engaging portion 3211 includes two first wedge-shaped protrusions arranged on the inner wall of the insertion cavity 3210, and first inclined surfaces of the two first wedge-shaped protrusions are inclined along an insertion direction of the connection head 311. The second engaging portion 3111 includes a second wedge-shaped protrusion arranged on an outer wall of the connection head 311, and a second inclined surface of the second wedge-shaped protrusion is inclined in the opposite direction of the insertion direction of the connection head 311. When the connection head 311 is inserted into the insertion cavity 3210, the first inclined surface and the second inclined surface cooperate with each other to allow the first engaging portion 3211 to pass through the insertion cavity 3210.

As illustrated in FIG. 7 to FIG. 13, in some embodiments, the head end 31 of the fixing member 3 has an extension 34, which is connected to the connection head 311. The extension 34, the head end 31 and the connection head 311 define a notch 310. One sidewall of the connection seat 321 defines an opening 320. When the head end 31 of the fixing member 3 is connected to the tail end 32, the extension 34 is accommodated in the opening 320, and a portion of the one sidewall of the connection seat 321 is accommodated in the notch 310. Such a configuration effectively improves the tightness and firmness of the connection between the connecting head 311 and the connection seat 321, reduces the gap between the head end 31 and the connection seat 321, and improves the integrity of the fixing member 3 after the head and tail are connected.

In some embodiments, in order to improve the structural integrity of the plurality of outer pleats 112 without affecting the filtering efficiency of the filter element, a height H of the fixing member 3 is set between 5 mm and 50 mm. If the height H of the fixing member 3 is too excessive, a larger area of the plurality of outer pleats 112 may be blocked, thereby reducing the contact surface between the plurality of outer pleats 112 and the unfiltered liquid, ultimately degrading the filtration efficiency of the filter element 1. If the height H of the fixing member 3 is insufficient, the reduced connection area between the plurality of outer pleats 112 and the fixing member 3 diminish the clamping force of the fixing member 3 on the plurality of outer pleats 112. In some embodiments, the height H of the fixing member 3 is 12 mm. In some embodiments, the height H of the fixing member 3 can also be 10 mm, 20 mm, 30 mm, 40 mm, etc.

As illustrated in FIG. 7 to FIG. 13, in some embodiments, the outer contour defined by the plurality of outer pleats 112 is cylindrical. A plurality of teeth 35 are provided on an inner end surface 33 of the fixing member 3, and the plurality of teeth 35 are arranged at intervals along the outer contour defined by the plurality of outer pleats 112. A first receiving gap 1120 is formed between two adjacent outer pleats 112, and a second receiving gap 350 is formed between two adjacent teeth 35.

When the head end 31 and the tail end 32 of the fixing member 3 are fastened to the plurality of outer pleats 112, each tooth 35 extends radially into one corresponding first receiving gap 1120, and each outer pleats 112 is accommodated in one corresponding second receiving gap 350, allowing the plurality of teeth 35 to support the plurality of outer pleats 112, thereby reducing the deformation of the plurality of outer pleats 112 or the occurrences that the plurality of outer pleats 112 are detached from the fixing member 3 due to excessive pressure during the filtering cycles. This improves the clamping effect of the fixing member 3 on the plurality of outer pleats 112, ensuring the structural integrity of the plurality of outer pleats 112. Furthermore, the plurality of teeth 35 preserve the gaps between the plurality of outer pleats 112, which simultaneously boosts the filtering efficiency of the filter element 1 and increases the contaminant retention capacity of the swimming pool filter cartridge, thereby extending its cleaning cycle.

In some embodiments, the plurality of teeth 35 are arranged at equal intervals along the circumferential contour defined by the plurality of outer pleats 112, and the plurality of outer pleats 112 are also arranged at equal intervals along an axial direction of the body 2. When the head end 31 and the tail end 32 of the fixing member 3 are fastened to the plurality of outer pleats 112, each tooth 35 is placed in a corresponding first receiving gap 1120, and each outer pleat 112 is placed in a corresponding second receiving gap 350. The swimming pool filter cartridge thus arranged maintains uniform spacing between the plurality of outer pleats 112, and the plurality of teeth 35 forms uniform support for the plurality of outer pleats 112. This configuration improves the structural integrity of the plurality of outer pleats 112 and enhances the filtration efficiency of the filter element 1, which further enhances the contaminant retention capacity of the swimming pool filter cartridge and extends its cleaning cycle.

In some embodiments, the number of the plurality of outer pleats 112 is 41, and they are surrounded to form a cylindrical profile, creating a corresponding set of 41 first receiving gaps. In this way, the number of teeth 35 is also set to 41 to ensure that each first receiving gap 1120 receives a tooth 35. In some embodiments, two, three, four or even more teeth 35 may be provided in each first receiving gap 1120. It is only necessary to ensure that the number of teeth 35 disposed in each first receiving gap 1120 is the same, allowing the plurality of outer pleats 112 to be equally spaced and stably supported.

In some embodiments, each first receiving gap 1120 accommodates varying numbers of teeth 35, provided that the plurality of outer pleats 112 maintain structural support.

In some embodiments, a thickness D of each tooth 35 is set between 1 mm and 10 mm. Such a setting reduces the manufacturing cost of the fixing member 3 and ensures the supporting effect of the plurality of teeth 35 on the plurality of outer pleats 112.

In some embodiments, the tooth 35 has a root 351 connected to the inner end face 33 and a tip 352 extending radially, and a circumferential length of the tip 352 along a corresponding one outer pleat 112 is smaller than a circumferential length of the root 351 along the corresponding one outer pleat 112. In this way, an opening of the second receiving gap 350 is gradually reduced in the direction from the tip 352 to the root 351, facilitating accommodation of each of the plurality of outer pleats 112.

Figure 14:
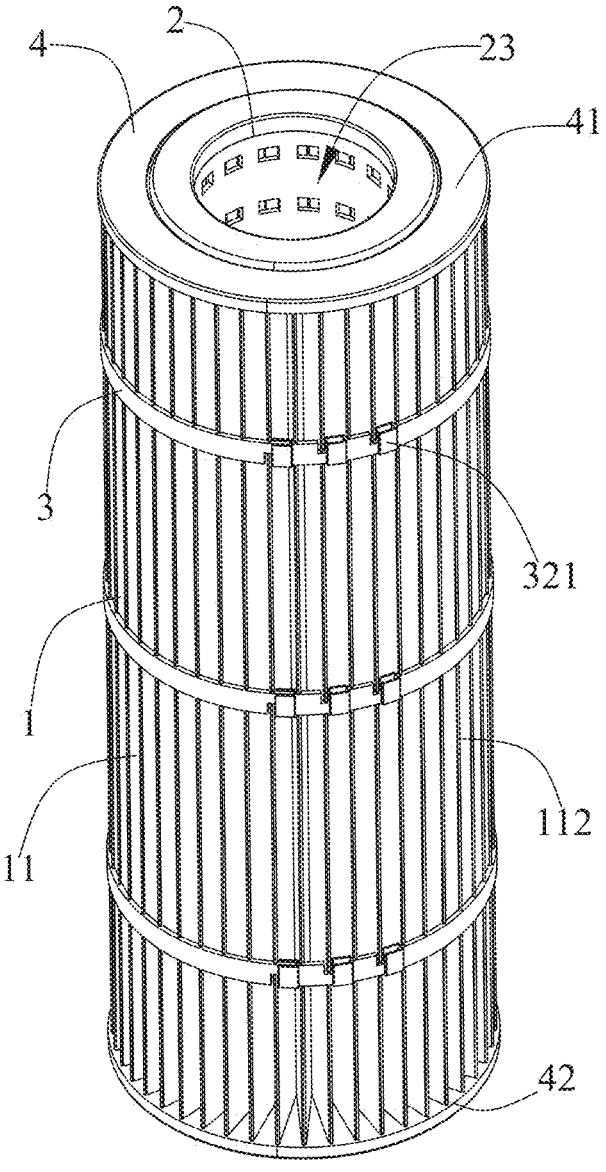
FIG. 14 is a perspective view of a swimming pool filter cartridge according to some embodiments of the present disclosure.
Figure 15:
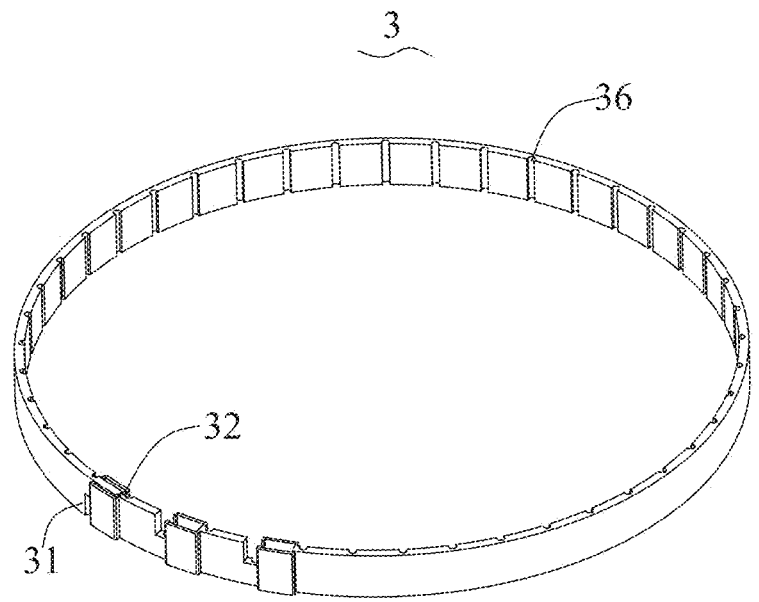
FIG. 15 is a perspective view of a fixing member according to some embodiments of the present disclosure.

As illustrated in FIG. 14 and FIG. 15, in some embodiments, the inner end surface 33 of the fixing member 3 is defined with a plurality of grooves 36, and the plurality of grooves 36 extend along the axial direction of the body 2. The plurality of grooves 36 are arranged at intervals along the circumferential contour defined by the plurality of outer pleats 112. When the head end 31 of the fixing member 3 is connected to the tail end 32 and is sleeved on the plurality of outer pleats 112, the plurality of grooves 36 receive and position the plurality of outer pleats 112 the plurality of outer pleats 112. This improves the structural integrity of the plurality of outer pleats 112 and the positioning effect of the fixing member 3 on the plurality of outer pleats 112, and reducing the deformation of the plurality of outer pleats 112 or the occurrences of escaping from the fixing member 3 during the filtering cycles.

In some embodiments, the plurality of grooves 36 are arranged at equal intervals along the circumferential contour defined by the plurality of outer pleats 112. The number of grooves 36 is the same as the number of outer pleats 112, and each groove 36 receives and positions an outer pleat 112. Such a configuration can not only improve the structural integrity of the plurality of outer pleats 112, but also enable the plurality of outer pleats 112 to be arranged at equal intervals, thereby improving the filtration efficiency of the filter element 1. Furthermore, the plurality of outer pleats 112 arranged at even intervals also improves the contaminant retention capacity of the swimming pool filter cartridge and extends its cleaning cycle.

The connection between the plurality of outer pleats 112 and the plurality of grooves 36 can be any one of snap-in, bonding, and ultrasonic welding, provided that the plurality of outer pleats 112 can be accommodated in the plurality of grooves 36. In some embodiments, the plurality of outer pleats 112 are snapped into the plurality of grooves 36.

As illustrated in FIG. 1 to FIG. 7, in some embodiments, the swimming pool filter cartridge includes: a filter element 1, a body 2, a fixing member 3 and an end cap 4.

In some embodiments, the filter element 1 has radially extending pleats 11. The pleats 11 include a plurality of inner pleats 111 defining a central chamber 10 and a plurality of outer pleats 112 defining an outer contour. The body 2 extends through the central chamber 10 and is connected to the plurality of inner pleats 111. In an axial direction of the body 2, the body 2 includes a first end 21 and a second end 22. Two end caps 4 are provided, which are respectively a first end cap 41 and a second end cap 42. The first end cap 41 and the second end cap 42 are respectively connected to the first end 21 and the second end 22 of the body 2. Two ends of the filter element 1 extending along the axial direction of the body 2 are respectively connected to and secured by the corresponding first end cap 41 and the second end cap 42, thereby improving the structural integrity of the connection of the filter element 1.

The fixing member 3 extends circumferentially along the outer contour defined by the plurality of outer pleats 112. The fixing member 3 has a head end 31 and a tail end 32. The head end 31 is provided with a connection head 311, and the tail end 32 is provided with a connection seat 321. The connection head 311 and the connection seat 321 achieves the detachable connection between the head end 31 and the tail end 32, and the plurality of outer pleats 112 are connected to the inner end face 33. When the fixing member 3 is assembled with the plurality of outer pleats 112, the head-to-tail connected fixing member 3 is tied to the plurality of outer pleats 112 to position the plurality of outer pleats 112. A plurality of teeth 35 are provided on the inner end face 33 of the fixing member 3, and the plurality of teeth 35 are circumferentially spaced along the outer contour defined by the plurality of outer pleats 112. A first receiving gap 1120 is formed between two adjacent outer pleats 112, and a second receiving gap 350 is formed between two adjacent teeth 35.

When the head end 31 and the tail end 32 of the fixing member 3 are fastened to the plurality of outer pleats 112, the plurality of teeth 35 extend radially into the first receiving gaps 1120, and the plurality of outer pleats 112 are accommodated in the second receiving gaps 350. In this way, the plurality of teeth 35 support the plurality of outer pleats 112, thereby reducing the deformation of the plurality of outer pleats or the occurrences of escaping from the fixing member 3 due to excessive pressure during the filtering cycles. Furthermore, this improves the positioning effect of the fixing member 3 on the plurality of outer pleats 112, and ensures the structural integrity of the plurality of outer pleats 112. In addition, the plurality of teeth 35 also keep the gaps between the plurality of outer pleats 112, improving the filtering efficiency of the filter element 1, increasing the contaminant retention capacity of the swimming pool filter cartridge, and extending the cleaning cycle of the swimming pool filter cartridge.

As illustrated in FIG. 1 to FIG. 7, in some embodiments, the body 2 defines a plurality of perforations 20, and the plurality of perforations 20 are evenly distributed in a sidewall of the body 2. The perforation 20 improves the liquid permeability through the body 2, directly increasing the filtering efficiency of the swimming pool filter cartridge.

In some embodiments, the body 2 is a hollow tubular structure, and a support member 24 is provided in a tube cavity 23 of the body 2. The support member 24 enhances the structural rigidity of the body 2, effectively mitigating the collapse risks of the body 2. In some embodiments, the support member 24 is provided about an axis of the tube cavity 23 of the body 2, greatly improving the structural rigidity of the body 2.

In some embodiments, the support member 24 is disc-shaped, an annular outer peripheral wall of the support member 24 is connected to a circumferential sidewall of the tube cavity 23, thereby enabling omnidirectional support of the body 2, further reinforcing the structural rigidity of the body 2.

In some embodiments, at least one perforation 240 is provided on the support member 24, thereby improving the liquid permeability through the support member 24 and reducing the influence of the support member 24 on the filtering efficiency.

From the above description, it can be seen that the above-mentioned embodiments of the present disclosure achieve the following technical effects.

1) The fixing member 3 can improve the structural integrity of the plurality of outer pleats 112, thereby reducing the deformation of the plurality of outer pleats 112 or the detachment of the fixing member 3 due to excessive pressure on the filter element 1 during the filtering cycles.

2) The fixing member 3 is detachably arranged by means of the connecting head 311 and the connection seat 321. In the case where the plurality of outer pleats 112 are deformed or detached from the fixing member 3, the fixing member 3 can be disassembled, the plurality of outer pleats 112 can be adjusted, and then the fixing member 3 can be re-tied to the plurality of outer pleats 112. The fixing member 3 set in this way not only improves the structural integrity of the plurality of outer pleats 112, but also adjusts the plurality of outer pleats 112 after disassembly to reduce direct damage, and the new fixing member 3 can be reduced to fix the plurality of outer pleats.

3) A plurality of connection seats 321 enable precise installation of the fixing member 321 based on the outer size defined by the plurality of outer pleats 112. By selectively inserting the connection head 311 into a corresponding connection seat 321, the circumferential size of the fixing member 3, formed when joining the head end 31 and the tail end 32, is adjustable. The fixing member 3 adapts to the filter element 1 of different radial sizes.

4) When the head end 31 and the tail end 32 of the fixing member 3 are fastened to the plurality of outer pleats 112, the plurality of teeth 35 radially engage the first receiving gaps 1120, and the plurality of outer pleats 112 are nested in the second receiving gaps 350. Thus, the plurality of teeth 35 support the plurality of outer pleats 112, reducing the deformation of the plurality of outer pleats or the occurrence of escaping from of the fixing member 3 due to excessive pressure during the filtering cycles, enhancing the clamping effect of the fixing member 3 on the plurality of outer pleats 112, and maintaining the structural integrity of the plurality of outer pleats 112. In addition, the plurality of teeth 35 preserve gaps between the plurality of outer pleats 112, not only optimizing the filtering efficiency of the filter element 1, but also enhancing the contaminant retention capacity of the filter element 1 and prolonging the cleaning interval of the filter element 1.

The above are only some embodiments of the present disclosure, and does not limit the patent scope of the present disclosure. All equivalent structural changes made by using the contents of the present disclosure specification and drawings under the inventive concept of the present disclosure, or directly/indirectly applied in other related technical fields are included in the protection scope of the present disclosure.

What is claimed is:

1. A swimming pool filter cartridge, comprising:
a filter element comprising radially extending pleats, the pleats comprising a plurality of inner pleats defining a central chamber and a plurality of outer pleats defining an outer contour;
a body extending through the central chamber and connected to the plurality of inner pleats; and
a fixing element extending circumferentially along the outer contour, the fixing element comprising a head end and a tail end, the head end being provided with a connection head, the tail end being provided with a connection seat, the connection head being detachably connected to the connection seat to allow the head end and the tail end of the fixing element to be connected and sleeved on the plurality of outer pleats, and the plurality of outer pleats being connected to an inner end surface of the fixing element;
wherein the connection seat defines an insertion cavity for inserting the connection head, a first engaging portion is protruded on an inner wall of the insertion cavity, a second engaging portion is protruded on a sidewall of the connection head facing the first engaging portion, the second engaging portion has a positioning end face, and the second engaging portion extends through the insertion cavity to allow the positioning end face to abut against the first engaging portion.

2. The swimming pool filter cartridge according to claim 1, wherein a number of the connection seat is at least two, and the at least two connection seats are arranged at intervals along an extension direction of the fixing element, and the connection head is configured to be selectively inserted into one of the at least connection seats.

3. The swimming pool filter according to claim 1, wherein the head end of the fixing member has an extension, the extension is connected to the connection head;
the head end, the connection head, and the extension define a notch;

the connection seat is provided with an opening; and
the extension is accommodated in the opening and a portion of a sidewall of the connection seat is accommodated in the notch in response to the head end and the tail end of the fixing member being connected.

4. The swimming pool filter according to claim 1, wherein a height of the fixing member is between 5 mm and 50 mm.

5. The swimming pool filter according to claim 1, wherein a plurality of teeth are arranged on the inner end surface of the fixing member and are distributed circumferentially along the outer contour, a first receiving gap is formed between two adjacent of the plurality of outer pleats, and a second receiving gap is formed between two adjacent of the plurality of teeth;
each of the plurality of teeth extend radially into one of the first receiving gaps and each the plurality of outer pleats is accommodated in one of the second receiving gaps in response to the head end and the tail end of the fixing member are fastened to the plurality of outer pleats.

6. The swimming pool filter according to claim 5, wherein the plurality of teeth are arranged at equal intervals along a circumference of the outer contour, and the plurality of inner pleats are arranged at equal intervals along a circumference of the body;
each of the first receiving gaps accommodates one of the plurality of teeth, and each of the second receiving gaps accommodates one of the plurality of outer pleats in response to the head end and the tail end of the fixing member being fastened to the plurality of outer pleats.

7. The swimming pool filter according to claim 5, wherein a thickness of each of the plurality of teeth is between 1 mm and 10 mm.

8. The swimming pool filter according to claim 5, wherein each the plurality of teeth comprises a root connected to the inner end surface and a tip extending radially, and a circumferential length of the tip along the plurality of outer pleats is smaller than a circumferential length of the root along the plurality of outer pleats.

9. The swimming pool filter according to claim 1, wherein the inner end surface of the fixing member defines a plurality of grooves spaced apart along the outer contour, and the plurality of grooves extend along an axial direction of the body; and
the plurality of grooves receive the plurality of outer pleats and are fixedly connected to the plurality of outer pleats in response to the head end and the tail end of the fixing member being fastened to the plurality of outer pleats.

10. The swimming pool filter according to claim 9, wherein a number of the plurality of grooves is the same as a number of the plurality of outer pleats, and each of the plurality of grooves receives and positions one of the plurality of outer pleats.

11. The swimming pool filter cartridge according to claim 1, further comprising:
a first end cap and a second end cap, the first end cap and the second end cap being respectively connected to a first end and a second end of the body, and two ends of the filter element extending along an axial direction of the body and being respectively connected to the first end cap and the second end cap to secure the two ends of the filter element.

12. The swimming pool filter cartridge according to claim 11, wherein the body defines a plurality of perforations, and the plurality of perforations are evenly distributed on a sidewall of the body.

13. The swimming pool filter cartridge according to claim 11, wherein the body is a hollow tubular structure, and a support member is arranged in a tube cavity of the body.

14. The swimming pool filter cartridge according to claim 13, wherein the support member is disc-shaped, and the support member is arranged with at least one of the plurality of perforations.

\* \* \* \* \*